J. R. SCOHY.
GLASS CUTTER.
APPLICATION FILED MAY 6, 1920.
1,359,751.
Patented Nov. 23, 1920.
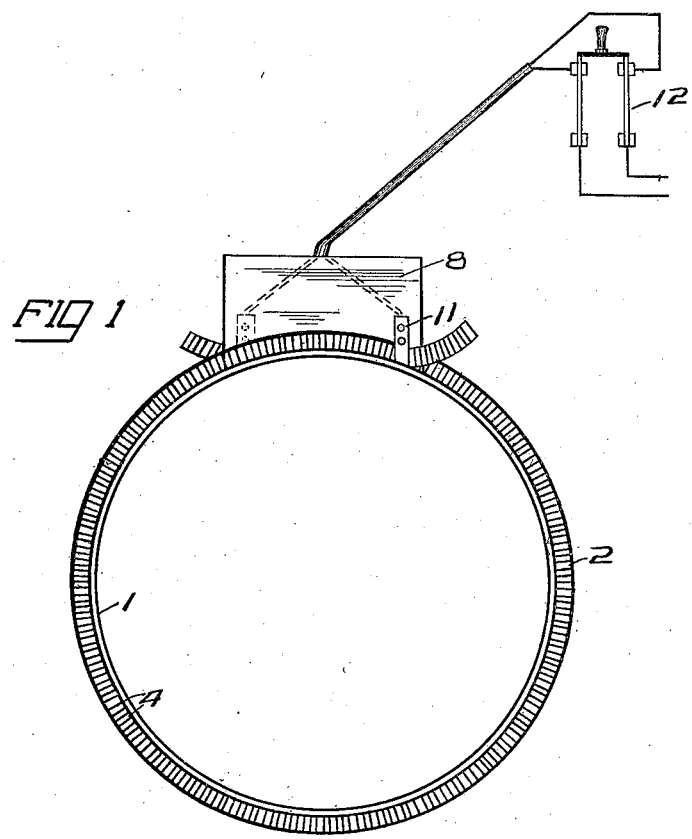
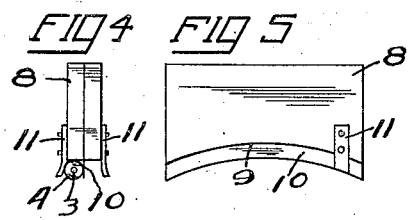
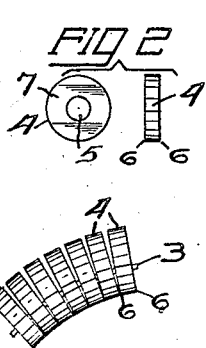
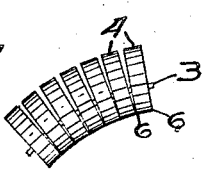
INVENTOR
John R. Scohy,
by
Owen Owen & Crampton

UNITED STATES PATENT OFFICE.

JOHN R. SCOHY, OF OKMULGEE, OKLAHOMA.

GLASS-CUTTER.

1,359,751. Specification of Letters Patent. Patented Nov. 23, 1920.

Application filed May 6, 1920. Serial No. 379,286.

*To all whom it may concern:*

Be it known that I, JOHN R. SCOHY, a citizen of the United States, and a resident of Okmulgee, county of Okmulgee, and State of Oklahoma, have made an Invention Appertaining to Glass-Cutters; and I do hereby declare the following to be a full, clear, and exact description of the invention, such as will enable others skilled in the art to which it appeartains to make and use the same, reference being had to the accompanying drawings, and to the characters of reference marked thereon, which form a part of this specification.

My invention relates to means for cutting glass. It may be used for cutting glass cylinders, commonly formed in the manufacture of window glass or it may be used in cutting plate glass, that is, after the cylinders have been flattened out. The cutter may be used for cutting glass in any form or shape. The cutter may be supported in any suitable way for convenience of manipulation to cut glass of any form. Cutters containing my invention may partake of different forms. To show the practical application of my invention I have shown the cutters in position for cutting a glass cylinder. The structure selected for purpose of illustration is shown in the accompanying drawings.

Figure 1 of the drawings is a side view of the cutter showing the cutter in position about a glass cylinder. Fig. 2 shows side and edge views of one of the disks that form a means for heating the glass along a definite line. Fig. 3 is an enlarged view of a plurality of the disks, somewhat exaggerated, to illustrate the manner in which the arcs formed between the disks shown in Fig. 2 will lie close to the surface of the glass cylinder. Fig. 4 is an end view of the the means for connecting the cutter with a source of current supply and for keeping the ends of the cutter separated and insulated from each other when the cutter is used for cutting a glass cylinder. Fig. 5 is a side view of the device illustrated in Fig. 4.

1, Fig. 1 of the drawings, is the glass cylinder to be cut by the cutter embodying my invention. 2 is the cutter. It consists of a flexible cable 3 preferably of wire on which is strung a plurality of disks 4 having openings 5 through which the wire 3 is threaded. The disks 4 preferably have substantially square corners as at 6 and flat surfaces 7 so that when the wire 3 is drawn about the glass cylinder or when by a suitable means the lower portions of the disks 4, particularly near the edges 6, are forced together, the portions of the edges 6 in contact with the glass cylinder or, in the other case in contact with the glass plate, will be in close contact with each other, while the outer or upper rim portions of the disks will be slightly separated or at any rate the contact will not be as close as along the line of the disks where they rest against the glass cylinder, a glass plate or any other glass article or object. If then, a current of electricity is directed through the disks it will pass, at least in greater part, along the line of least resistance, which will be along the line where the edges 6 of the disks make closest contact with each other. This will produce a series of arcs running around the cylinder or along the plate of glass or other object and in close proximity or in contact with the glass which will cut the glass along the line of contact between the cutter and the glass.

The disks or beads 4 may be connected with a source of current supply by any suitable means. In the drawing I have illustrated a block 8 of insulating material which may be connected to the cutter when the cutter is used for cutting a glass cylinder. The lower edge 9 of the block 8 conforms substantially to the curvature of the cylinder to be cut. A mica strip 10 is suitably secured in the insulating block 8. If desired, the insulating block 8 may be formed of two parts and the mica strip 10 may be secured between the two parts. The lower edge of the mica strip 10 also conforms to the curvature of the cylinder. Contacts 11 may be secured on opposite sides and at the opposite ends of the block 8. The contacts extend below the block 8 and on opposite sides of the mica strip 10, and at a distance from the mica strip 10 sufficient to permit the disks 4 to be placed between the mica strip and the contacts 11 and yet make good contact with the contacts 11. The contacts 11 thus may be made of spring material and may be so formed that they slope outward slightly from the block 8. A source of current supply is connected with the contacts 11 by means of wires that extend through the block 8. The source of current supply may be connected by means of the switch 12 to the contacts 11. When a cylinder is to be cut by means of the cutter, the cutter is placed around the cylinder and drawn against the cylinder. The end portions of the cutter overlap and are placed close to the mica strip 10 and against the contacts 11, that is, between the mica strip 10 and the contacts 11. By reason of the fact that the beads or disks 4 are placed close together and bent in the form of a curve about the cylinder, the portions of the edges of the disks against the cylinder are brought in close contact and are thus placed and held in this position of contact between each other and between them and the glass by the contacts 11 located on the block 8. When therefore, the switch 12 is closed to connect the source of current with the cutter the current will form a series of arcs between the disks along the surface of the glass cylinder which will heat the glass along this line and fracture or cut the glass along this definite line.

Where the cutter is to be used for cutting plate glass, the disks may be tightly pressed together on their lower sides by any suitable means to cause closer contact along the edges of the disks in contact with the glass which will, when the current passes through the disks, produce the same results and cut along the line of contact of the cutter with the glass.

The disks may be formed of any suitable material which will operate to localize the heat produced by the current, that is, to localize the current itself and subject the current to resistance in passing from disk to disk. I find it preferable to use carbon disks in making up the cutter.

I claim:—

1. In a glass cutter, a plurality of members placed in juxtaposition along the line of contact between the cutter and the glass, and means for connecting the members to a source of current supply.

2. In a glass cutter, a plurality of bead-like members, means for connecting the members to a source of current supply.

3. In a glass cutter, a plurality of disk shaped members placed in successive juxtaposition with one another, and means for connecting a source of current supply with the members.

4. In a cutter, a cable, a plurality of disks threaded on the cable, means for connecting the disks with a source of current supply.

5. In a cutter, a plurality of members, means for causing the members to make closer contact along one side of the members than on the other side of the members, and means for connecting the members to a source of current supply.

6. In a cutter, a plurality of disks, means for drawing disks together and causing the disks to make closer contact on one side than on the other side, and means for connecting the disks with a source of current supply.

In testimony whereof I have hereunto signed my name to this specification.

JOHN R. SCOHY.